July 3, 1923.
N. KRAMER ET AL
AUTOMOBILE RADIATOR
Filed Sept. 18, 1917
1,460,852
2 Sheets-Sheet 2
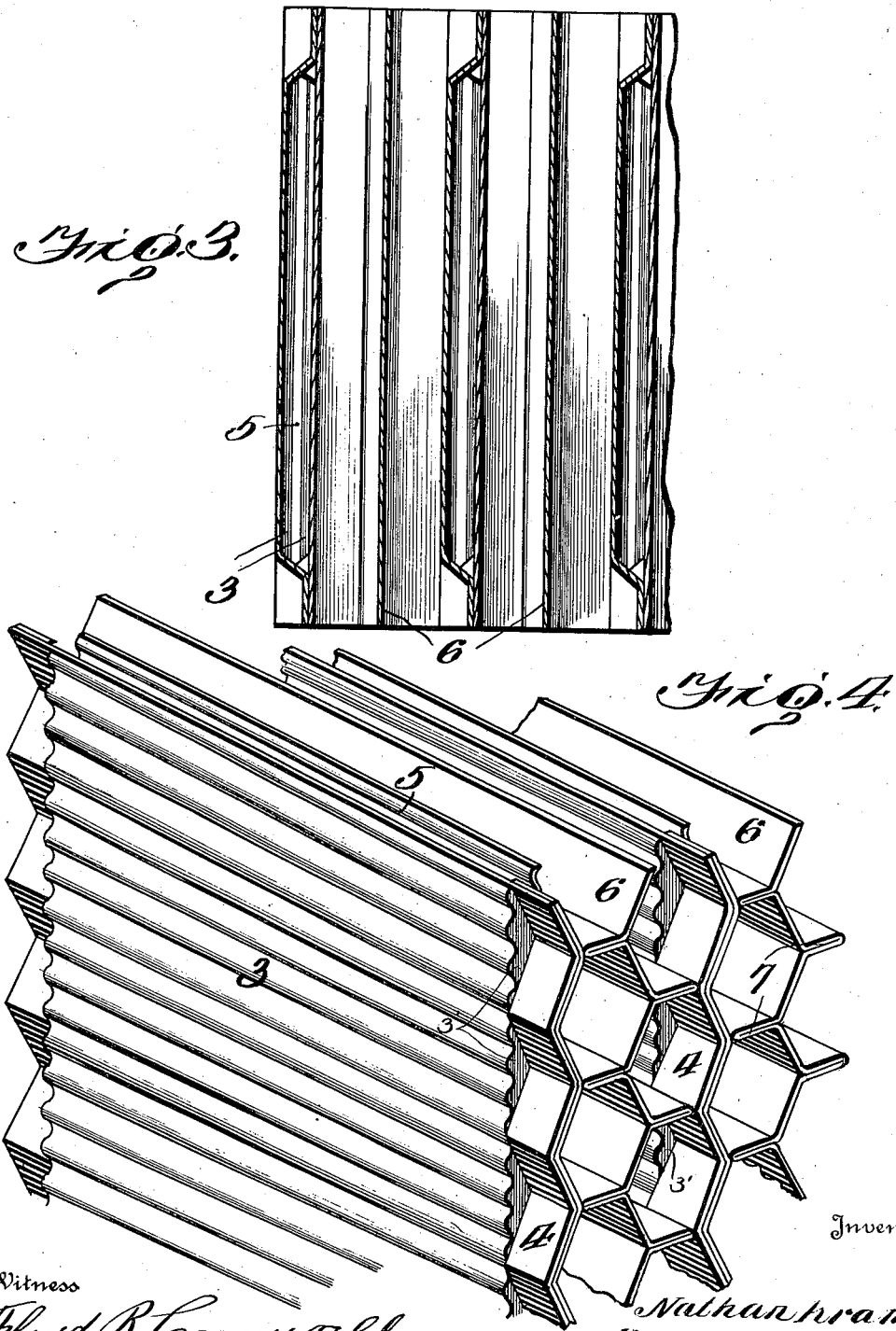

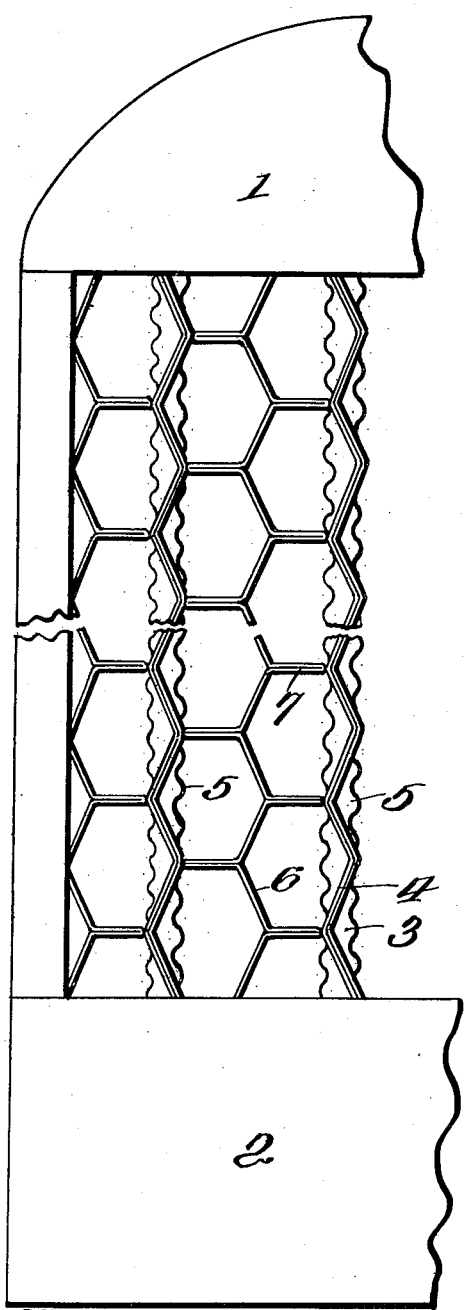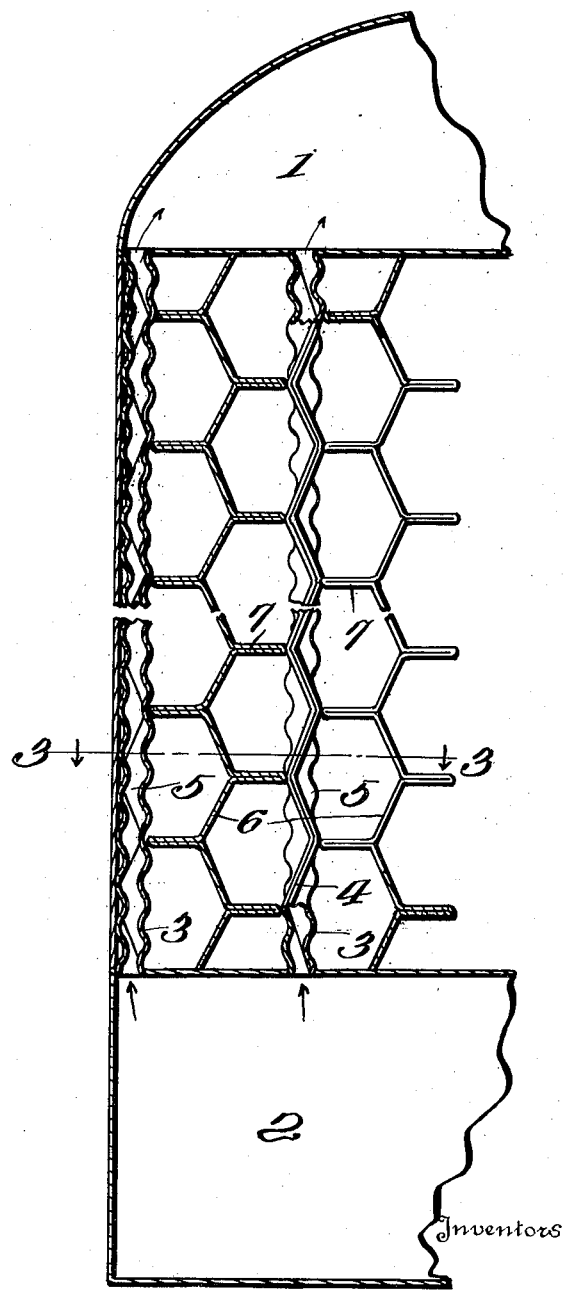

Patented July 3, 1923.

UNITED STATES PATENT OFFICE.

NATHAN KRAMER AND BENJAMIN KRAMER, OF TRENTON, NEW JERSEY, ASSIGNORS TO TRENTON AUTO RADIATOR WORKS, OF TRENTON, NEW JERSEY, A FIRM.

AUTOMOBILE RADIATOR.

Application filed September 18, 1917. Serial No. 191,961.

*To all whom it may concern:*

Be it known that we, NATHAN KRAMER and BENJAMIN KRAMER, citizens of the United States, residing at Trenton, in the county of Mercer and State of New Jersey, have invented certain new and useful Improvements in Automobile Radiators, of which the following is a specification, reference being had therein to the accompanying drawing.

This invention relates to certain new and useful improvements in automobile radiators, and more particularly to a construction of the core therefor, the object being to provide a radiator with vertically disposed water passage ways separated by horizontally disposed air passages so constructed that the cost of manufacturing is reduced to a minimum and one which will have high cooling efficiency.

Another object of our invention is to provide a core having water passages separated by fins which are independent of the water passages in order to lessen the leakage caused by the vibration of the motor.

Another and further object of our invention is to provide an automobile radiator in which the water passages are formed by duplicate strips provided with corrugated portions forming the side walls of the passage-ways, the marginal edges of said strips being formed zigzag and placed in contact with one another in order to form a watertight closure for the edges of said passageway.

Other and further objects and advantages of the invention will be hereinafter set forth and the novel features thereof defined by the appended claims.

In the drawings,

Figure 1 is an elevation of a portion of the radiator constructed in accordance with our invention;

Figure 2 is a vertical section partly in elevation showing the vertically disposed water passageways in section and horizontally disposed hexagonal air passages separating the water passages;

Figure 3 is a section taken on line 3—3 of Fig. 2, and

Figure 4 is a perspective view of a portion of the core of the radiator constructed in accordance with our invention.

Like numerals of reference refer to like parts in the several figures of the drawing.

In constructing an automobile radiator in accordance with our invention we employ upper and lower water chambers 1 and 2 between which is arranged our improved construction of core which is provided with vertically disposed water passages connecting the upper and lower water chambers of the radiator, and horizontally disposed air passages extending from the front to the rear of the radiator in order to expose the side walls of the water passages to a current of air passing through the air passages so as to provide a radiator with a high cooling efficiency.

The vertical water passageways of the core are composed of a pair of duplicate strips of brass or analogous material, each strip being formed two and one-half to four inches wide and of any length desired according to the size of the radiator to be constructed having its central or body portion corrugated as shown at 3, inclined portions 3' and the marginal portions or edges being bent into zigzag form as shown at 4 so that when placed together a central vertical water passageway 5 is formed. In assembling the strips the zigzag edges are placed in contact with one another as shown in perspective view in Fig. 4, and secured by any suitable means so as to form a watertight closure for the edges of the passageways 5, and these zigzag edges form two sides of an oblong hexagon.

Arranged to each side of each water passageway is a fin 6 formed of a strip of any suitable material corresponding in size to the strip employed for producing the water chamber, said strip being bent to form four sides of an oblong hexagon, the oppositely disposed horizontal plaits 7 of which are arranged in such position in respect to the zigzag edges of the strips forming the water chamber that the edges of the plaits engage the points of the zigzag portions of the plates as clearly shown in Figs. 1, 2 and 4 in order to produce a plurality of horizontally disposed oblong hexagonal shaped air passages extending from the front to the rear of the radiator.

By constructing a core for a radiator in this manner a series of spaced unobstructed vertically disposed water passages are formed independent of the air passages formed by the fin so as to eliminate leakage and to provide a radiator which has a high cooling efficiency as the air passages are so constructed that the corrugated sides of the water passages are exposed to the currents of air passing therethrough.

The corrugated body of the strips forming the side walls of the water chamber utilize the additional metal necessary for forming the zigzagged edges without stretching the metal and enables the core to be constructed very cheaply.

From the foregoing description it will be seen that we have provided a radiator core construction which is composed of a plurality of strips of two different forms so assembled that a pair of strips of one form produces vertically disposed water passages, and two sides of a hexagon in connection with a strip of another form forms an oblong hexagonal air passage which is independent of the water passages. It will also be seen that this construction enables these strips to be previously formed and readily assembled so that the construction of the radiator is greatly reduced.

We claim:

1. A radiator having upper and lower water chambers connected together by vertically disposed water passages formed of duplicate strips having corrugated central portions and zig-zag marginal edge portions, the central corrugations being greater in number than the zig-zag edge portions, said zig-zag edge portions being in contact with one another to form closures for the vertically disposed water passages, said water passages being separated by fins forming horizontally disposed substantially hexagonal shaped air passages.

2. A radiator having a core provided with water and air passages, the water passages being formed of duplicate strips having corrugated central portions and zig-zag edge portions, the central corrugations being greater in number than the zig-zag edge portions, the zig-zag edge portions being arranged in contact with one another to form closures for the water passages formed by the corrugated portions of said strips, said water passages being separated by air passages formed of fins bent to form four sides of a hexagon, the ribs of the fins contacting with the points of the zig-zag edge portions of the duplicate strips to produce hexagonal air passages between each water passage.

3. A radiator comprising upper and lower water chambers connected together by fins and vertically disposed water passages, the water passages being formed of spaced duplicate strips having corrugated central portions and zig-zag edge portions, the central corrugations being greater in number than the zig-zag edge portions, the zig-zag edge portions being arranged in contact and secured together to form closures for the front and rear edges of the water passages, said water passages being separated by air passages formed by fins bent to form four sides of a hexagon, the ribs of the fins contacting with the points of the zig-zag portions of the duplicate strips to produce hexagonal air passages between each water passage.

In testimony whereof we hereunto affix our signatures in the presence of two witnesses.

NATHAN KRAMER.
BENJAMIN KRAMER.

Witnesses:
STELLA S. APPLEGATE,
ALEXANDER RUDER.